Aug. 13, 1963    R. J. MYOTTE    3,100,412
VERTICAL FEED CUT-OFF SAW
Filed July 8, 1959    2 Sheets-Sheet 1

INVENTOR.
ROBERT J. MYOTTE
BY
*Williams, Tilbury, & Tolrick*
ATTORNEYS

INVENTOR.
ROBERT J. MYOTTE
BY
Williams, Tilbury & Tobrick
ATTORNEYS

United States Patent Office 3,100,412
Patented Aug. 13, 1963

3,100,412
VERTICAL FEED CUT-OFF SAW
Robert J. Myotte, Euclid, Ohio, assignor to National Copper and Smelting Company, Cleveland, Ohio, a corporation of Ohio
Filed July 8, 1959, Ser. No. 825,730
6 Claims. (Cl. 83—163)

This invention relates to a cut-off saw for tube and bar stock, and more particularly to a cut-off saw of the variety in which stock is vertically supported in a rotating turret for transportation into contact with the cutting blade portion of the apparatus.

It is among the objects of this invention to provide a cut-off saw in which the stock is placed in a vertically positioned, cylindrical bracket wherein the stock may gravity feed through a rotating turret or drum; to provide a vertical feed cut-off saw which can be side loaded as opposed to similar devices which must be loaded from the top end of the apparatus; to provide a vertical feed cut-off saw having stock self-aligning features in association with the work holding cylindrical bracket; to provide novel means for intercepting and ejecting odd length end pieces from the apparatus to provide novel work gripping belt means in association with the work holding and transporting turret of the apparatus; and to provide a novel arrangement of parts including inclination of the work holding bracket and turret to the vertical so as to enable side loading without complex work holding and positioning attachments.

Other objects of my invention include a vertical feed cut-off saw which is simple in construction; which detects and ejects end pieces of stock below a minimum length with a novel mechanical arrangement of belts and pulleys; and which provides a quick-change turret suitable for one diameter of stock quickly replaceable with turrets designed to accommodate stock of other diameters.

The features of this invention which are believed to be novel are set forth with particularity in the appended claims. The invention itself, however, both as to its organization and use, together with further objects and advantages thereof, may best be understood by reference to the following description taken in conjunction with the accompanying drawings in which:

Figure 2:
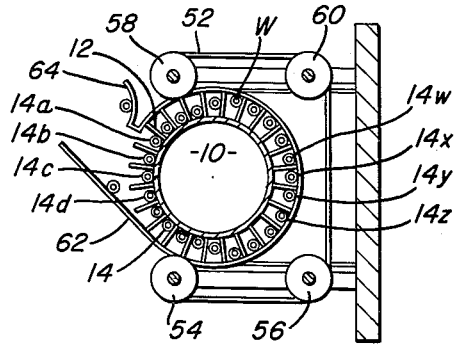
FIGURE 2 is an enlarged top plan view of the cut-off saw illustrated in FIGURE 1.
Figure 1:
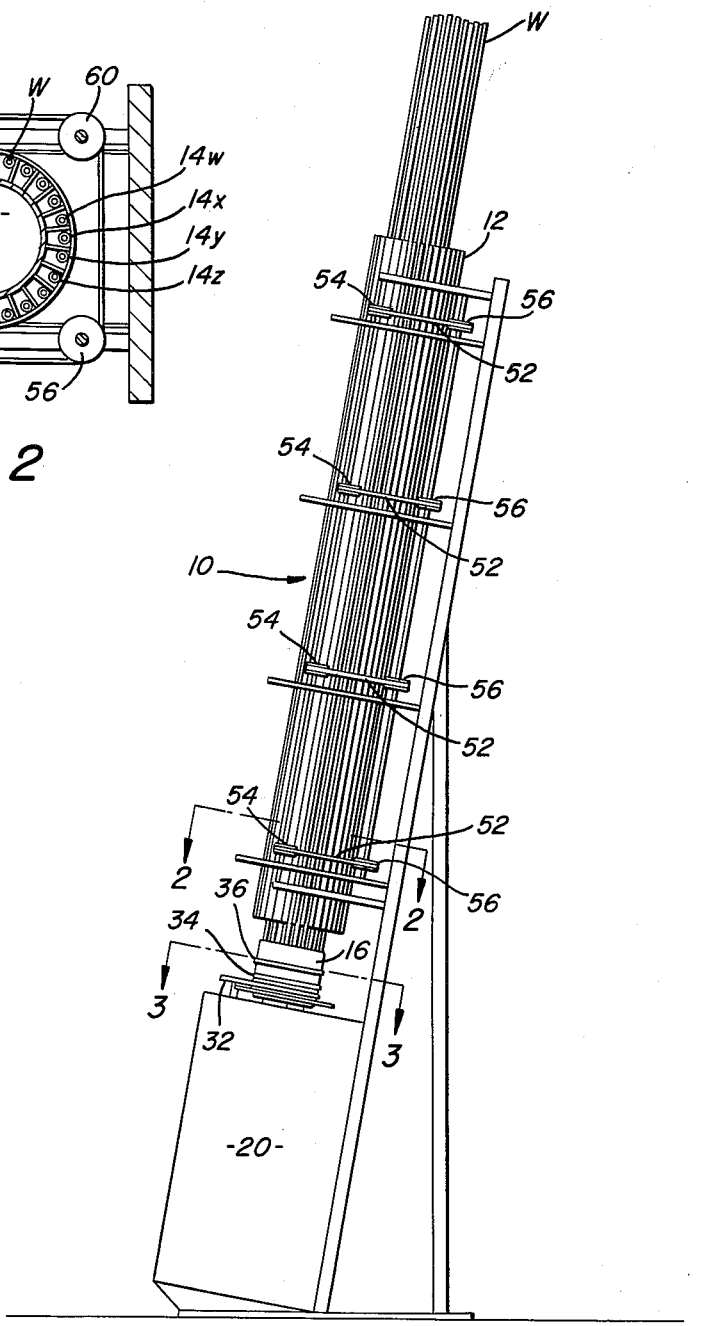
FIGURE 1 is an elevational view of a preferred embodiment of the subject vertical feed cut-off saw.
Figure 3:
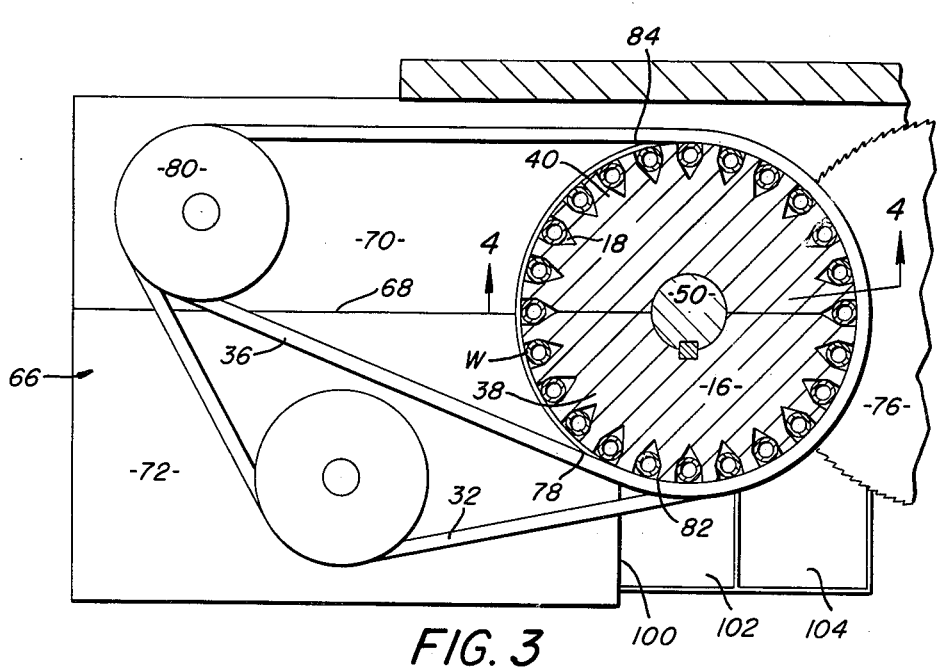
FIGURE 3 is an enlarged sectional view taken on the line 3—3 of FIGURE 1, illustrating the novel drive belt arrangement employed with this invention.
Figure 4:
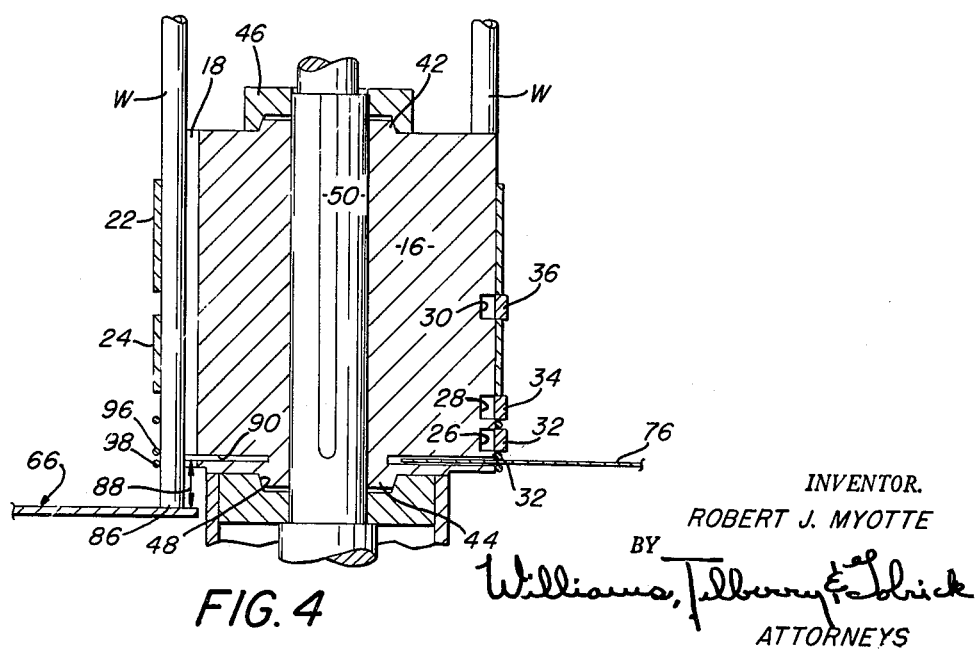
FIGURE 4 is an enlarged sectional view taken on the line 4—4 of FIGURE 3 illustrating the workpiece transporting turret.

Referring now to the drawings in greater detail, and in particular to FIGURES 1 and 2, the invention includes a cylindrical work holding bracket 10 having a plurality of partitions 12 evenly spaced about the periphery of the cylinder and projecting radially outwardly therefrom. Each pair of partitions define a work holding compartment 14 in which an elongated workpiece of tube or bar stock W, for example from 10 to 15 feet in length, may be placed for transportation in the saw as will be more fully described hereinbelow. The work holding bracket 10 is axially aligned and secured to the topside of a work holding turret 16, having a plurality of work receiving longitudinal slots 18 in communication with the work holding compartments 14 of the bracket 10. The turret 16, in turn, is supported for rotation in a base 20. The slots 18 are evenly spaced about the periphery of the turret 16 and are encircled by annular bands 22 and 24 (see FIGURE 4). It will be observed from FIGURE 4 that annular grooves 26, 28, and 30 are machined into the turret to provide seats for belts 32, 34, and 36 as will be described hereinafter. The turret 16 is comprised of two semi-cylindrical portions 38 and 40 (see FIGURE 3) having matching semi-cylindrical neck portions 42 and 44 at the top and bottom respectively of each half (see FIGURE 4). The upper neck portions 42 are engaged by a sliding collar 46, and the lower neck portions 44 fit in a recess 48 of the base 20. The bracket 10 and the turret 16 are mounted for rotation about a common axis on shaft 50 which is inclined a few degrees from vertical, as shown in FIGURE 1.

Referring now to FIGURES 1 and 2, it will be observed that belts 52 circumferentially engage approximately two-thirds the circumference of the work holding bracket 10 and are adapted to run on a plurality of pulleys 54, 56, 58, and 60. Thus, as the bracket is rotated, the belts 52, through frictional engagement, rotate with the bracket 10. By inclining the entire apparatus a few degrees from vertical, workpieces W placed in compartments 14a, 14b, 14c, and 14d will by virtue of the inclination of the brackets 10 tend to remain therein. This portion of the bracket shall be referred to as the topside, and compartments 14w, 14x, 14y, and 14z shall be referred to as defining the underside of the bracket 10. Thus, as the turret rotates, the workstock is carried to the opposite side and there is maintained in its respective compartment by virtue of the belts 52 which, as already described, rotate with the bracket 10. With this arrangement, therefore, a workstock W is loaded into each compartment 14 laterally from the floor by an operator as each compartment reaches the center of the topside position of rotation of the bracket 10. Thereafter, the workstock W is maintained therein by virtue of the circumferential engagement of the belts 52 with the bracket 10. As a matter of practice, in loading, the operator will take the lower end of a piece of workstock W and place it in one of the longitudinal slots 18 of the turret 16. Once the lower end of the workstock W is located, the rest of the workstock will recline into its proper compartment 14. However, should there be overlapping of compartments by the workstock because of its great length and flexibility, the belts 52 will hold the workstock against further movement and although it will be carried around the bracket 10 in a skew relationship therewith, no harm will come to it and proper alignment can thereafter be made when the workstock W once again reaches the topside portion of the bracket 10. To further assist the operator in loading the workstock W while the bracket 10 is in motion, guide members 62 and 64 are positioned on each side of the top side portion of the bracket.

Referring again to FIGURE 3, it will be observed that a split platform 66 having a part-line at 68 is comprised of portions 70 and 72. Both portions 70 and 72 are adjustable vertically so as to define a common horizontal plane. Platform 66 is positioned beneath the turret 16 and with the turret in overlapping relationship therewith. A circular cut-off saw blade 76 is also spaced beneath the turret 16 and with the turret 16 in overlapping relationship therewith. Belts 34 and 36 make circumferential engagement with the turret 16 first at position 78 and thereafter encircle drive pulley 80. Belt 32 makes circumferential engagement with turret 16 at position 82 on the turret beyond that at which belts 34 and 36 make engagement therewith.

Operation

Having thus identified all of the pertinent features of the cut-off saw, its operation will now be discussed. With the work holding bracket 10 and turret 16 rotating in unison, the operator will place workstock W in a topside compartment 14 making sure that the lower end of the workstock is engaged in a longitudinal slot 18 of the turret 16 immediately beneath an aligned compartment 14. The weight of the workstock W will cause it to shift downwardly until it comes to rest and is supported by the top edge of belt 36. Thereafter, the workstock W rides thereon until belt 36 leaves the turret 16 at position 84 (see FIGURE 3) to pass around pulley 80. The workstock W at this point being free of belts 34 and 36 drops until its lower end engages platform portion 70. Platforms 70 and 72 are gaging platforms, that is to say, they are adjustable vertically so as to position the lower end 86 of a workstock W (see FIGURE 4) beneath saw blade 76 a predetermined distance 88 so that segments of uniform length are cut by the saw blade 76. Platform portion 70 is separate from platform portion 72 primarily to absorb and isolate from portion 72 the impact of the workstock W dropping from the top edge of the belt 36 to the platform. This continuous impinging of the platform portion 70 by workstock W may tend to misalign the vertical adjustment of portion 70 somewhat, and it is therefore separated from the portion 72, which is thus left undisturbed and once adjusted will maintain its accurate position vertically with respect to the cut-off saw blade 76.

The workstock W is rotated about the portion of the turret 16 not circumscribed by either belt 32 or belts 34 and 36 until finally remaking contact again with belts 34 and 36 at position 78. Belts 34 and 36 thus co-act with the turret 16 to grip the workstock W in its slot 18. Additional rotation to position 82 brings the workstock into gripping relationship with belt 32, so that at least two belts (belts 32 and 34, and preferably additional belt 36) are securely pressing the workstock W into the crotch of the slot 18 prior to being intercepted by circular saw blade 76. It will be observed that a deep horizontal slot 90 is provided in turret 16 to receive the cutting portion of the circular saw blade 76. As the workstock W continues to be transported circularly with turret 16 and securely held thereto by belts 32, 34, and 36 after having a length 88 cut therefrom, position 84 is again reached at which time the workstock W is released from belt engagement, and again, by force of gravity, drops to impact absorbing platform portion 70 for transportation to gaging portion 72. The workstock W is then re-positioned for a second cut by the circular saw blade 76, and this cycle continues until the workstock is cut down to a length less than the distance from the topside of gage plate 72 to the underside of belt 34. This random length end piece of workstock W is then loosely held in a slot 18 by means of retaining rings 96 and 98 but, of course, cannot be re-engaged by belts 34 and 36 when transported to position 78. Thereafter, as the workstock W continues to rotate with the turret 16, it reaches the edge 100 of table 72 and, therefore, drops free of the turret before engagement is made by belt 32. A scrap hopper 102 may be positioned beneath the turret 16 and table edge 100 for collecting these random end pieces. A second hopper 104 is positioned in overlapping relationship with turret 16 and saw blade 76 to receive finish sawed workpieces. Thus, it will be observed that by a novel arrangement of belts in association with and partially circumferentially engaging turret 16, means have been provided for automatically feeding tube and bar stock W vertically downward into engagement with a circular cut-off saw blade 76. This arrangement further co-acts to eject or separate the random tail ends of the workpieces W from the turret 16 so as to avoid commingling of odd length ends with standard cut pieces.

While only one embodiment of my invention has been disclosed and discussed hereinabove, still other arrangements and modifications will occur to those skilled in the art upon a reading of this specification taken in conjunction with the drawings, and other arrangements may be resorted to without departing from the spirit and scope of the invention as defined by the appended claims.

I claim:

1. In a gravity feed cut-off saw for tube and bar stock having a stock indexing drum rotatable substantially about a vertical axis, and saw means to cut stock into predetermined lengths, the improvement comprising: upper and lower belt means circumferentially engaging said drum, said lower belt means coming into engagement with said drum at a circumferential position beyond said position at which said upper belt means makes engagement; gravity feed slots longitudinally aligned about the periphery of said drum; a stock supporting platform beneath said drum and overlapped by that drum portion not belt engaged; said saw means including a saw blade vertically positioned between said platform and said lower belt and overlapped by the belt engaged portion of said drum; an elongated cylindrical stock supporting rack secured to the top side of said drum in axial alignment therewith and adapted to support a substantial portion of length of stock; said rack having a plurality of radially projecting partitions spaced about its periphery to define stock receiving compartments in communication with said drum gravity feed slots; said drum and rack being inclined to the vertical sufficiently to maintain stock in said topside compartments; and belt means in circumferential engagement with all but said topside compartments, whereby said topside compartments are freely accessible for side loading of stock in said rack, and whereby stock placed in said rack is gravity fed into said drum feed slots to drop to said platform when indexed to the belt-free portion of said drum, and whereafter said stock is indexed between said belts and said drum into engagement with said saw, the random length tail ends of said stock, of length equal to or less than the distance from said platform to the lower edge of said upper belt, dropping free from said drum between said drum engaging positions of said upper and lower belt means.

2. In a gravity feed cut-off saw for tube and bar stock having a stock indexing drum rotatable substantially about a vertical axis, and saw means to cut stock into predetermined lengths, the improvement comprising: upper and lower belt means circumferentially engaging said drum, said lower belt means coming into engagement with said drum at a circumferential position beyond said position at which said upper belt means makes engagement; gravity feed slots longitudinally aligned about the periphery of said drum; a stock supporting platform beneath said drum and overlapped by that drum portion not belt engaged; and saw means including a saw blade vertically positioned between said platform and said lower belt and overlapped by the belt engaged portion of said drum; an elongated cylindrical stock supporting rack secured to the top side of said drum in axial alignment therewith; and adapted to support a substantial length of stock; said rack having a plurality of radially projecting partitions spaced about its periphery to define stock receiving compartments in communication with said drum and gravity feed slots; said drum and rack being inclined to the vertical sufficiently to maintain stock in top side compartments; and belt means in circumferential engagement with all but said top side compartments including a pair of pulleys positioned on opposite sides of said top side compartments and a belt threaded on said pulleys to pass from one pulley around the underside of said rack, around the other pulley and returned to said first mentioned pulley, said belt and said rack moving in unison to retain workstock therein whereby said top side compartments are freely accessible for side loading of stock in said rack, and whereby stock placed in said top side compartments is gravity fed into said drum slots onto said platform when said stock is indexed to the belt free portion of said drum, said stock thereafter being indexed between said belts and said drum into engagement with said saw blade, the random length tail ends of said stock, of lengths equal to or less than the distance of said platform to the lower edge of said upper belt, dropping free from said drum between said drum engaging positions of said upper and lower belt means.

3. In a gravity feed cut-off saw for tube and bar stock having a stock indexing drum rotatable substantially about a vertical axis; and saw means to cut stock into predetermined lengths, the improvement comprising: said drum being split into semi-cylindrical halves, each half having a semi-cylindrical neck; an elongated cylindrical stock supporting rack secured to the topside of said drum in axial alignment therewith, and adapted to support a substantial portion of a length of stock; said rack having a plurality of radially projecting partitions spaced about its periphery to define stock receiving compartments in communication with said feed slots; a vertically slidable collar secured to the underside of said rack adapted to secure said semi-cylindrical necks whereby the said drum is quickly removable from said rack; means to retain said stock in said compartments; upper and lower belt means circumferentially engaging said drum, said lower belt means coming into engagement with said drum at a circumferential position beyond said position in which said upper belt means makes engagement therewith; gravity feed slots longitudinally aligned about the periphery of said drum; a stock supporting platform beneath said drum and overlapped by that drum portion not belt engaged; and said saw means including a saw blade vertically positioned between said platform and said lower belt and overlapped by said belt engaged portion of said drum, whereby stock placed in said gravity feed slots drop to said platform when indexed to the belt free portion of said drum, and are thereafter indexed between said belts and said drum into engagement with said saw, the random length tail ends of said stock of lengths equal to or less than the distance from said platform to the lower edge of said upper belt dropping free from said drum between said drum engaging positions of said upper and lower belt means.

4. In a gravity feed cut-off saw for tube and bar stock having a work piece indexing turret rotatable substantially about a vertical axis, and saw means to cut work pieces into predetermined lengths, the improvement comprising: upper and lower belt means circumferentially engaging said turret, said lower belt means coming into engagement with said turret at a circumferential position in the direction of rotation beyond said position at which said upper belt means makes engagement: gravity feed slots longitudinally aligned about the periphery of said turret; a work piece supporting platform beneath said turret and overlapped by said turret portion not belt engaged; and saw means including a saw blade vertically positioned between said platform and said lower belt and overlapped by the belt engaged portion of said turret, whereby work pieces placed in said gravity feed slots drop to said platform when indexed to the belt-free portion of the said turret, and are thereafter indexed between said belts and said turret into engagement with said saw, the random length tail ends of said work pieces of length equal to or less than the distance from said platform to the lower edge of said upper belt dropping free from said turret between said turret engaging positions of said upper and lower belt means; said work piece supporting platform comprising a first portion to initially receive the impact of work pieces dropping in said gravity feed slots to said platform; and a second portion separate from said first portion and in the same horizontal plane adapted to gage the cut-off lengths of the work pieces and to support said work pieces until gripped by said upper belt, said work piece supporting portion being vertically adjustable.

5. A gravity feed cut-off saw comprising: a turret rotatable about a substantially vertical axis; work pieces locating longitudinal slots based about the periphery of said turret; a first annular groove about said turret; tension belt means adapted to ride in said groove and encircle a portion of said turret; a second annular groove about said turret and spaced beneath said first annular groove; second tensioned belt means adapted to ride in said second annular groove and to encircle a portion of said turret, said belts making tangential contact with said turret on one side along a common longitudinal line, and on the other side said first belt means making tangential contact with said turret in the direction of rotation before said second belt means makes tangential contact with said turret; work piece retaining means encircling said turret below said first belt means to confine but permit free sliding movement of said work pieces in said longitudinal turret slots, a work piece supporting platform positioned beneath the portion of said turret free of belt contact; means to load work pieces with the lower ends resting on said first belt means adjacent the arc of contact of said first mentioned belt means; and means to rotate said turret; whereby work pieces ride on said first mentioned belt around its arc of contact, and thereafter are free to drop to said work piece support platform for continued arcuate movement into work piece gripping contact by said first and second belts; and saw means adapted to intercept the portions of said work pieces projecting beneath said second belt, the random length tail ends of said work pieces, equal to or less than the distance from said platform to the lower edge of said upper belt means being retained in said gravity feed slots by said work piece retaining means for indexing to the position beyond tangential engagement by said first belt with said turret but before tangential engagement by said lower belt with said turret, whereby said random length tail ends are free to drop out of said gravity feed slots.

6. In a gravity feed cut-off saw for tube and bar work piece having a work piece indexing turret rotatable substantially about a vertical axis, and saw means to cut work pieces into predetermined lengths, the improvement comprising: upper and lower belt means circumferentially engaging one side of said turret, the other side of said turret being belt-free, said upper belt means making tangential engagement with said turret in the direction of rotation prior to tangential engagement with said turret by said lower belt means; gravity feed slots longitudinally aligned about the periphery of said turret; a work piece supporting platform beneath said belt-free portion of said turret; saw means vertically positioned between said platform and said lower belt, work piece retaining means encircling said turret below said upper belt means to confine but permit free sliding movement of said work pieces in said gravity feed slots, whereby work pieces placed in said gravity feed slots freely drop to said platform when indexed to the belt free portion of said turret and are thereafter gripped between said belts and said turret to be indexed into cutting engagement with said saw means, and random length tail ends of said work pieces of length equal to or less than the distance from said platform to the lower edge of said upper belt are retained in said gravity feed slots by said work piece retaining means for indexing to the position beyond tangential engagement by said upper belt with said turret but before tangential engagement by said lower belt with said turret, whereby said random length tail ends are free to drop out of said gravity feed slots before reaching said saw means.

References Cited in the file of this patent

UNITED STATES PATENTS

| | | |
|---|---|---|
| 1,058,714 | Binns | Apr. 15, 1913 |
| 2,398,230 | Keller | Apr. 9, 1946 |
| 2,453,140 | Kubaugh | Nov. 9, 1948 |